United States Patent Office 3,178,380
Patented Apr. 13, 1965

3,178,380
NEW COPOLYMERS, PROCESS FOR THEIR
PREPARATION AND THEIR USE
Daniel Porret, Basel, Switzerland, assignor to Ciba Limited, Basel, Switzerland, a company of Switzerland
No Drawing. Filed Oct. 23, 1962, Ser. No. 232,607
Claims priority, application Switzerland, Oct. 31, 1961,
12,604/61
6 Claims. (Cl. 260—21)

The present invention provides new copolymers which are obtained by polymerizing
(a) An ester of the formula (I)  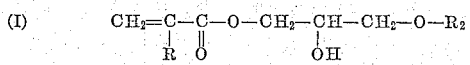

in which $R_1$ stands for a hydrogen atom or a lower alkyl radical with 1 to 4 carbon atoms, and $R_2$ for an aliphatic, cycloaliphatic, araliphatic or aromatic hydrocarbon residue which may be substituted by halogen atoms or interrupted by oxygen atoms, preferably being an alkyl radical with 1 to 18 carbon atoms, with
(b) At least one other copolymerizable ethylenically unsaturated monomeric compound.

The copolymerization is advantageously performed with the use of 5 to 30%, preferably of 8 to 20%, of the ester (a) containing hydroxyl groups calculated from the total weight of the monomers.

In the above Formula I of the ester (a) $R_1$ stands above all for a hydrogen atom or an alkyl radical with 1 to 4 carbon atoms, such as the ethyl or more especially the methyl radical. —$OR_2$ represents the residue of a monohydric alcohol or phenol of the formula $$HOR_2$$

As monohydric phenols there may be mentioned the following: Phenol, ortho-, meta- and para-cresol, xylenols, naphthols, chlorinated phenols such as ortho-, meta- and para-chlorophenol and pentachlorophenol.

The monohydric alcohol may be aliphatic or cyclic. It may belong to the heterocyclic, alicyclic or araliphatic series; as relevant examples there may be mentioned: Tetrahydrofurfuryl alcohol, cyclohexanol, alkoxy-substituted or alkyl-substituted cyclohexanols such as ortho-methylcyclohexanol, para-methoxycyclohexanol; also decahydronaphthols, terpene alcohols such as isoborneol; also araliphatic alcohols such as benzyl alcohol or phenylethyl alcohol. The residue —$OR_2$ stands, however, preferably for the residue of a saturated aliphatic alcohol with 1 to 18 carbon atoms whose alkyl groups may be unbranched or branched and possibly interrupted by ether oxygen atoms. There may be mentioned: Methanol, ethanol, propanol, isopropanol, butanol, isobutanol, tertiary butanol, amyl, 2-ethylbutyl, n-hexyl, heptyl, 2-ethylhexyl, dodecyl or octadecyl alcohol; also methoxyethanol, ethoxyethanol, butoxyethanol and butoxybutanol. The esters of these alcohols $HOR_2$ are derived from α-alkylacrylic acids, such as methacrylic acid and preferably acrylic acid. It goes without saying that instead of a single ester of the Formula I there may be used a mixture of several such esters with different alcohol and/or acid residues.

Particularly good results have been achieved with the esters of the formula (II)  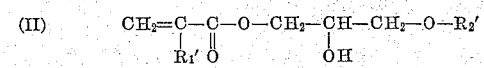

in which $R_1'$ stands for a hydrogen atom or a methyl group and $R_2'$ for an alkyl radical with 1 to 12 carbon atoms, thus, for example, with the acrylic acid-[3-(n-butoxy)-2-hydroxyl]-propyl ester and the methacrylic acid -[3-(n-butoxy)-2-hydroxyl]-propyl ester.

The hydroxylated monomeric esters of the Formulae I and II respectively are readily accessible, for example, by reacting acrylic or methacrylic acid with monoglycidyl ethers of phenols or alcohols, such as phenylglycidyl ether, creslglycidyl ether, pentachloro-phenylglycidyl ether, propylglycidyl ether, hexylglycidyl ether and more especially butylglycidyl ether.

From among the starting monomers (b) that can be copolymerized with the hydroxylated esters of the Formula I those are suitable which contain a carbon-to-carbon double bond, more especially an $H_2C$$C$═ group.

As such esters there may be mentioned: Acrylonitrile, methacrylonitrile, styrene, vinylchloride, chlorotrifluorethane, 1:1-difluorethane, acrylamide or methacrylamide, and their derivatives containing 1 to 8 carbon atoms substituted at the nitrogen, such as N-diethylacrylamide, N-propylacrylamide, N-di-n-butylacrylamide or N-tertiary butylacrylamide; furthermore vinylalkyl ethers with about 2 to 10 carbon atoms in the alkyl group, such as vinylethyl ether, vinylbutyl ether, vinyl-2-ethylbutyl ether or vinyl-2-ethylhexyl ether. Preferred use is made of vinyl esters of aliphatic carboxylic acids with 2 to 4 carbon atoms, such as vinyl acetate or propionate, or esters from acrylic or methacrylic acid with alcohols containing 2 to 10 carbon atoms, such as ethylacrylate, ethylmethacrylate, n-butylacrylate or (2-ethylhexyl)-acrylate.

Particularly valuable technical properties are found in copolymers containing a polymerized proportion of 5–30% by weight, preferably 8 to 20% by weight, of the monomeric ester (a), calculated from the total weight of the monomers.

Among the afore-mentioned copolymers particularly advantageous properties are found in the binary or ternary copolymers containing in addition to 5–30% by weight of the ester (a) also an acrylic acid ester such as butylacrylate and possibly a third monomer, more especially a vinyl ester such as vinyl acetate as copolymerization component. Said favorable properties manifest themselves more especially when synthetic textile fabrics, such as nylon fabrics, are provided with a water-repellent finish.

The manufacture of the copolymers by copolymerization of hydroxylated esters of the Formula I with one or several other copolymerizable ethylenically unsaturated monomers follows the usual practice, and consists for instance in block polymerization, bead polymerization, emulsion polymerization or preferably solvent polymerization in an organic solvent suitable for the purpose such, for example, as acetone, benzene, dichlorethane or ethyl acetate.

The polymerization is advantageously conducted at an elevated temperature, preferably at the boiling temperature of the solvent and in the presence of peroxidic or other catalysts that form free radicals and are soluble in the reaction medium such, for example, as benzoyl peroxide, lauroyl peroxide or α:α'-azoisobutyrodinitrile.

Depending on the polymerization conditions and monomeric parent materials used the polymers of the invention are obtained in the form of viscous solutions, granulates or emulsions.

Furthermore, it is possible to perform the polymerization of the monomers in the presence of a substratum, for example on a glass fibre fabric or on a textile material. In such a case it is of advantage to impregnate the substratum concerned with a solution or emulsion of the monomers and then to conduct the polymerization by heating the impregnated material in the presence of a polymerization catalyst.

Owing to their content of free hydroxyl groups the copolymers of the invention react with compounds containing several functional groups capable of reacting with hydroxyl groups, such as isocyanate or methylol groups, methylol groups etherified with lower alcohols, readily hydrolyzable ester groups or the like. Such polyfunctional compounds are therefore suitable as cross-linking or curing components for the hydroxylated copolymers of the invention.

As such cross-linking components there may be mentioned in the first place: di- and polyisocyanates such as ortho-, meta- and para-phenylenediisocyanate, toluylene-2:4-diisocyanate, 1:5-naphthylene-diisocyanate, hexamethylene - diisocyanate, 4:4'-diphenylmethane-diisocyanate, methylene-bis-(3 - methyl - 4 - phenylisocyanate), 3:3'-dimethoxy-4:4'-diphenyl-diisocyanate, 3:3'-dimethyl - 4:4'-diisocyanato-bisphenyl, 4:4' - dicyclohexylmethane-diisocyanate, chloro-2:4-phenylene-diisocyanate, N:N':N''-tris-(isocyanatohexyl)-biuret and the adduct obtained from 1 mol of hexanetriol and 3 mols of metaphenylene-diisocyanate; boroxines such as trimethoxyboroxine; titanic acid esters such as n-butyltitanate; alkyl-ortho-silicates such as ethyl-ortho-silicate; poly-(2:3-dihydro-1:4-pyranyl) compounds such as 2:3-dihydro-1:4-pyran-2-carboxylic acid-(2':3'-dihydro-1':4'-pyran-2' - yl)-methyl ester; polyglycidyl ethers such as butanediol diglycidyl ether and diglycidyl ethers; aldehydes such as formaldehyde; soluble condensation products of phenol and formaldehyde such as novolaks or resoles.

Preferred cross-linking components are aminoplasts that are soluble in water or in organic solvents, such as formaldehyde condensation products with urea, thiourea, guanidine, acetylene-diurea, dicyandiamide, also of aminotriazines such as melamine or of guanamines such as aceto guanamine, benzoguanamine, tetrahydrobenzoguanamine or formoguanamine, as well as their ethers with alcohols such as methanol, ethanol, propanol, allyl alcohol, butanol, amyl alcohol, hexyl alcohol, cyclohexanol, benzyl alcohol, lauryl, stearyl, oleyl or abietyl alcohol. In addition to the ether residues the condensation products may contain residues of higher acids such, for example, as stearic acid.

Particularly good industrial results are obtained in coating nylon fabrics to make them water-repellent by using, for example, as cross-linking component the esterification product from hexamethylolmelamine methyl ether and stearic acid.

The copolymers obtained according to the present process are suitable for a wide variety of uses. Quite generally, they can be used in any sphere in which polymerization resins are usually employed. They may be used in the unmodified form or in admixture with the usual additives, such as solvents, plasticizers, stabilizers, flame-inhibitors, pigments, extenders and fillers for the manufacture of moulding compositions and shaped structures, of films, adhesives or lacquers. In the form of solutions or emulsions the copolymers—provided they have been manufactured from suitable monomeric starting materials—are especially suitable as auxiliaries in the textile, leather and paper industries. They may be used primarily in the form of their solutions in organic solvents and in combination with the afore-mentioned polyfunctional cross-linking agents, such as polyisocyanates or soluble aminoplasts, for the production of soft, water-repellent dressings on textile fabrics, said dressings being insoluble in organic solvents, such as trichlorethylene, after having been cured.

The fabrics to be so dressed may be, for example, fabrics of native or regenerated cellulose such as cotton, linen, rayon or spun rayon or of acetylcellulose, and more especially fabrics from so-called fully-synthetic fibres. Among the latter there may be mentioned, for example, polyester fibres such as Dacron or Terylene (registered trademarks), polyacrylonitrile fibres such as Orlon (registered trademark), polyvinylchloride fibres such as Thermovyl (registered trademark) and more especially polyamide fibres such as Perlon (registered trademark) or nylon. As a rule, particularly good results are obtained on thin, closely woven fabrics.

When such compositions are suitably constituted they may also be used for the production of decorative and/or protective coatings on the surface of other materials, such as sheet metal, wood, glass, ceramics, plastic foils and the like, and also for impregnating paper, cardboard, carton and the like.

Accordingly, the present invention includes also substantially anhydrous coating preparations or coating compositions containing (1) A concentrated solution of the new hydroxylated copolymers in an organic solvent,
(2) As cross-linking agent a polyfunctional compound containing functional groups capable of reacting with hydroxyl groups, preferably a diisocyanate or polyisocyanate or an aminoplast resin that is soluble in organic solvents and, if desired,
(3) Compounds having hydrophobic properties such, for example, as natural waxes or paraffin waxes.

The concentrated aqueos solutions defined above under (a) contain with advantage polymers obtained by copolymerizing the preferably used hydroxlated esters of the Formula II with at least one acrylic or methacrylic acid alkyl ester such as n-butylacrylate and, if desired, at least one vinyl ester of a lower fatty acid such, for example, as vinylacetate, vinylpropionate or vinylbutyrate, the polymerization being performed with advantage in a suitable solvent so that the solvent required for the coating agent is already present in the polymer and need not be specially added.

Preferred organic solvents are those which are at most restrictedly miscible with water, for example monocyclic hydrocarbons of the benzene series, such as benzene, methylbenzene or dimethylbenzenes. Particularly useful are aliphatic esters of lower fatty acids whose alcohol residue contains up to 5 carbon atoms, such as methyl acetate, propyl acetate and more especially ethyl acetate. These esters are eminently suitable both as solvents for the copolymerization and as solvents for the preparations to be used in the coating process of the invention so that the present process can be performed in a very simple manner. As a rule the amount of solvent used should be at least such that the polymer is completely dissolved in it without the solution becoming so highly viscous that its use involves difficulties.

Like the copolymers mentioned about under (a), the cross-linking agents under (b) must be soluble in organic solvents, more especially in such solvents as are only restrictedly miscible with water. Preferred use is made in textile dressing preparations of melamine-formaldehyde condensation products with higher fatty acid or fatty alcohol residues such, for example, as the esterification products or etherification products obtained by condensing a hexamethylolmelamine methyl ether with a higher fatty acid such as palmitic or stearic acid, or with a higher alcohol such as stearyl alcohol. To produce protective coatings on other substrata, for example iron sheet or aluminium sheet, there may be used for instance the ethers of methylolmelamines with lower alcohols, such as methanol or butanol.

As compounds having water-repellant properties, which may optionally be present in the coating preparation in addition to ingredients (a) and (b), there are especially suitable natural or synthetic waxes, that is to say esters of higher monobasic acids with higher monohydric or dihydric alcohol residues, and also substances which are not really waxes but behave like waxes, more especially insofar as their physical properties (melting point, solubility, hardness) are concerned, that is to say above all mixtures of solid hydrocarbons. As examples of such hydrophobic wax-like substances there may be mentioned vegetable waxes such as carnauba, Japan and palm wax, insect waxes such as beeswax, petroleum wax such as paraffin wax, synthetic paraffin waxes and opal wax.

The coating preparations or compositions containing the ingredients (a), (b) and possibly (c) may contain further substances, for example fillers or pigments such as talcum, kaolin, lampblack, titanium dioxide, metal powders (so-called bronzes) and, if desired, also softeners for the textile material to be coated.

The amount of cross-linking agent (b), and of the optionally further used wax-like substance, needed is very small and ranges, for example, from about 0.5 to about 5% calculated on the total amount of the copolymer solution. It is of advantage to dissolve the cross-linking agent and the wax-like substances in one of the above-mentioned solvents before incorporating them with the coating preparation.

The coating preparations may be applied to the fabric in the usual manner, for example by immersing the fabric in the coating preparation and then squeezing it to the desired content thereof, or advantageously with the aid of a coating machine, preferably one equipped with a doctor device, and the fabric may be coated on one or on both sides. It is also possible to repeat the coating operation; in such a case it is useful to interpose a drying period at room temperature or at an elevated temperature, for example at 80 to 100° C., after every passage through the coating machine.

For curing the coats it is of advantage to heat the coated material at an elevated temperature, for example to above 100° C. A temperature from 120 to 130° C. and a curing period of 5 to 15 minutes will produce good results in most cases. The fabric treated in this manner may, if desired, also be smoothed, for example by treatment on a calender under a high pressure.

The cured dressings or protective coatings are distinguished by their pliability even at low temperatures, and by their very good adhesion.

The water-repellent, cured coatings on textile fabrics, such as nylon fabric, are not only very fast to washing but they are also stable towards the solvents generally used in dry-cleaning, such as carbon tetrachloride or trichlorethylene. Therefore, a conventional wash, for example in warm water containing a soap or soda, or a conventional dry-cleaning process, will not leave them tacky nor detach them from the fabric. In general, the coatings resist also other agencies to which they may be subjected during use, for example sunlight, heat, moisture and micro-organisms.

In U.S. Patent No. 2,681,897, granted 22, 1954, to American Cyanamid Company, there have been described copolymers of $\beta$-hydroxyethyl-methacrylate capable of being cross-linked with aminoplast resins such, for example, as methylolmelamine ethers.

Tests have shown, however, that the stability of these known copolymers is poor and that they have a strong tendency to self-crosslinking. It is therefore very difficult to copolymer $\beta$-hydroxyethyl-methacrylate with prevention of the formation of insoluble products and, consequently, of linking.

The afore-mentioned known copolymers are therefore hardly suitable for the manufacture of durable solutions to be used in coating textile materials.

Unless otherwise indicated, parts and percentages in the following examples are by weight.

*Example 1*

(a) A mixture of 162 g. of acrylic acid, 294 g. of n-butylglycide, 12 g. of anhydrous sodium acetate and 0.5 g. of hydroquinone is heated for 2 hours at 120° C. During the reaction the mixture turns more viscous. The sodium acetate dissolves at the beginning and then partially precipitates again in solid form. On completion of the reaction the batch is filtered with the aid of a small amount of active earth and the filtrate is fractionated under a high vacuum. At 35–45° C. under 0.2 mm. Hg pressure there are recovered 57 g. of a mixture of unreacted acrylic acid and unreacted butylglycide. There remain 395 g. of a crude hydroxylated acrylate which may be used as it is for the polymerization. By fractionation there are obtained at 94–95° C. under 0.25 mm. Hg pressure 354 g. of the pure acrylate of the formula

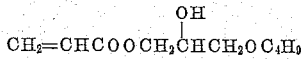

which contains a very small amount of hydroquinone. There remain 40 g. of a thick, dark residue consisting of acrylates of polyglycol-like polymers of butylglycide; this residue can be polymerized.

The yield of pure acrylate (acrylic acid-[3-(n-butoxy)-2-hydroxy]-propyl ester) amounts to 78% calculated from the reacted acrylic acid and the reacted butylglycide.

(b) A solution is prepared by mixing 300 g. of ethyl acetate, 170 g. of n-butylacrylate (stabilized with 0.01% of hydroquinone) and 55 g. of the pure acrylic acid-[3-(n-butoxy)-2-hydroxy]-propyl ester prepared as described in Example 1 under (a).

150 g. of this solution are introduced into a flask equipped with heating means, thermometer, anchor agitator, capillary for the introduction of gas and dropping funnel, and the air is displaced with nitrogen. The solution is then heated to 75° C. and a solution of 0.2 g. of benzoyl peroxide in a small amount of ethyl acetate is added. The reaction sets in after 2 minutes with the temperature rising within 2 to 3 minutes from 6° C. to 75–81° C. The remainder of the solution of the monomers is then added through the dropping funnel within 100 minutes, during which time the temperature is maintained at 80° C. After 20, 60 and 90 minutes another addition of 0.1 g. each of benzoyl peroxide (dissolved in ethyl acetate) is made. The reaction mixture turns gradually more viscous. On completion of the addition of the monomers the batch is stirred for 90 minutes longer and during this time two more additions of 0.1 g. each of benzoyl peroxide are made, whereupon the polymerization is complete. 20 g. of ethyl acetate are then added and the mixture is stirred until it is completely homogeneous. Yield: 545 g. of a colorless solution of the copolymer. This solution has a viscosity of 7960 centipoises at 25° C. and a dry content of 39.6%.

When the crude acrylic acid-[3-(n-butoxy)-2-hydroxy]-propyl ester is used instead of the pure product obtained by distillation, the polymerization takes the identical course, but the resulting solution of the copolymer has a brownish color.

*Example 2*

A mixture is prepared from 300 g. of ethyl acetate, 99 g. of vinylacetate, 99 g. of n-butylacrylate stabilized with 0.01% of hydroquinone, and 28g. of the acrylic acid-[3-(n-butoxy)-2-hydroxy]-propyl ester obtained as described in Example 1 under (a). 150 g. of this solution are heated in the apparatus described in Example 1 under (b to 75° C. in an atmosphere of nitrogen, whereupon 0.2 g. of benzoyl peroxide is added. The polymerization sets in after only 2 minutes. The remainder of the reaction batch is then added through the dropping funnel within 110 minutes at 80° C. Another addition of 0.1 g. of benzoyl peroxide each is made after 20, 50 and 80 minutes. When the whole of the reaction batch has been added, the reaction mixture is stirred for 4 hours longer at 78° C. Another addition of 0.1 g. of benzoyl peroxide each is made after 1 hour and 3 hours. The solution is then diluted with 30 g. of ethyl acetate and cooled, to yield 556 g. of a solution of the colourless, slightly turbid copolymer. This solution has a viscosity of 6370 centipoises at 25° C. and a dry content of 37.5%.

For comparison an attempt was made to prepare a copolymer by the process described in U.S. Patent No. 2,681,897 by replacing in the above example the acrylic acid(3-[n-butoxy]-2-hydroxy)-propyl ester by $\beta$-hydroxyethyl methacrylate. For this purpose a mixture was first prepared from 330 g. of ethyl acetate, 99 g. of n-butyl-acrylate, 99 g. of vinylacetate and 29 g. of β-hydroxyethyl methacrylate. 150 g. of this mixture were heated to 75° C. and a solution of 0.18 g. of benzoyl peroxide in a small amount of ethyl acetate was added. The remainder of the solution of the monomers was then added dropwise within 2 hours. During this time three more additions of 0.09 g. each of benzoyl peroxide were made. 15 minutes after the dropwise addition of the solutions of the monomers the polymerization solution formed a gelatinous mass, whereupon the experiment was discontinued.

A similar result was obtained when it was tried to manufacture of the copolymer I, shown in column 4, lines 21 to 37, of U.S. Patent No. 2,681,897:

250 g. of amylacetate (boiling at 175° C.) were heated to the boil under nitrogen. A mixture of 83 g. of β-hydroxyethyl methacrylate, 115.5 g. of styrene, 53 g. of methacrylic acid and 5 g. of a solution of 50% strength of butylperbenzoate in dimethyl phthalate was thin added dropwise in the course of 80 minutes. The polymer solution turned progressively thick and suddenly formed a gel on completion of the dropwise addition. The experiment was thereupon discontinued.

*Example 3*

(a) A mixture of 294 g. of butylglycide, 193 g. of methacrylic acid, 12 g. of anhydrous sodium acetate and 0.1 g. of hydroquinone is heated for 3 hours at 115° C. The reaction product is then distilled. At first, 58 g. of unreacted starting materials are recovered, after which 346 g. of the methacrylic acid ester of the formula

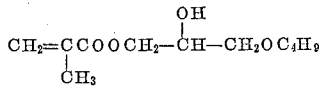

pass over at 93° C. under a pressure of 0.1 mm. Hg. Residue: 58 g. of a dark substance.

(b) A solution is prepared from 300 g. of ethyl acetate, 170 g. of n-butylacrylate stabilized with 0.01% of hydroquinone, and 59 g. of the methacrylic acid-[3-(n-butoxy)-2-hydroxyl]-propyl ester manufactured as described in Example 3 under (a). 150 g. of this solution are heated under nitrogen to 75° C. in the apparatus used in Example 1(b), whereupon 0.2 g. of benzoyl peroxide is added. After 15 minutes polymerization sets in with the temperature rapidly rising to 81° C. The remainder of the solution of the monomers is then added through the dropping funnel in the course of 100 minutes, while maintaining the temperature constant at about 80° C. During this operation, another addition of 0.1 g. each of benzoyl peroxide is made after 25, 50 and 75 minutes. When all of the batch of monomers has been added, polymerization is continued for 3 hours, during which time another two additions of 0.1 g. each of benzoyl peroxide are made, and finally 25 g. of ethyl acetate are added. On cooling there are finally obtained 555 g. of a solution of the colorless polymer. This solution has a viscosity of 3500 centipoises at 25° C. and a dry content of 38.9%.

*Example 4*

(a) A mixture of 68 g. of acrylic acid, 91 g. of ethylglycide, 5 g. of anhydrous sodium acetate and 0.1 g. of hydroquinone is heated for 2 hours at 115° C., whereupon the reaction product is subjected to fractional distillation. At first, 18 g. of unreacted starting materials pass over, followed by 99 g. of the acrylic acid ester of the formula

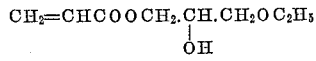

which distils at 72° C. under 0.2 mm. Hg pressure. A residue of 23 g. is left behind.

(b) A mixture of 300 g. of ethyl acetate, 99 g. of vinylacetate, 99 g. of n-butylacrylate and 27.5 g. of the acrylic acid-[3-ethoxy-2-hydroxy]-propyl ester manufactured as described in Example 4 is heated to 75° C., whereupon 0.18 g. of benzoyl peroxide is added. After 5 minutes a temperature rise is observed with the reaction mixture turning progressively thicker. The remainder of the solution of the monomers is then dropped in within 110 minutes at 80° C. During this time another 3 additions are made of 0.09 g. each of benzoyl peroxide dissolved in a small amount of ethyl acetate. The reaction mixture is mixed with 0.09 g. of benzoyl peroxide and heated on for 4 hours at 80° C. to complete the polymerization. Yield: 559 g. of a colorless solution of the copolymer, having a dry content of 37.2% and a viscosity of 3200 centipoises at 25° C.

*Example 5*

(a) A mixture of 64 g. of acrylic acid, 213 g. of laurylglycidyl ether, 8 g. of anhydrous sodium acetate and 0.1 g. of hydroquinone is heated for 2 hours at 120° C., whereupon the reaction product is distilled. 20 g. of unreacted starting materials pass over and leave 264 g. of a yellow liquid which cannot be distilled without decomposition and which consists of the crude acrylic acid ester of the formula

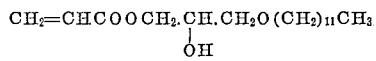

(b) A mixture of 300 g. of ethyl acetate, 92 g. of vinylacetate, 92 g. of n-butylacrylate and 42.5 g. of the acrylic acid-[3 - n-dodecyloxy - 2 - hydroxy]-propyl ester manufactured as described in Example 5(a) is heated to 75° C., whereupon 0.18 g. of benzoyl peroxide is added. After 5 minutes a rise in temperature is observed and the reaction mixture is turning thicker. The remainder of the solution of the monomers is then dropped in within 110 minutes at 80° C., during which time 3 additions of 0.09 g. each of benzoyl peroxide, dissolved in a small amount of ethyl acetate, are made. 0.09 g. of benzoyl peroxide is then added and the whole is heated for 2 hours longer at 80° C. to complete the polymerization which furnishes a highly viscous, colourless solution of the copolymer, having a dry content of 37.2%.

*Example 6*

(a) A mixture of 380 g. of ortho-cresylglycide, 152 g. of acrylic acid, 12 g. of anhydrous sodium acetate and 0.5 g. of hydroquinone is heated for 2 hours at 115° C., whereupon the reaction product is subjected to fractional distillation. At first, 105 g. of unreacted starting materials are recovered, and then 343 g. of the acrylic acid ester of the formula

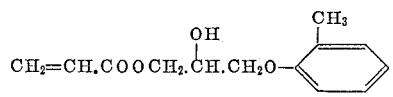

pass over at 124° C. under 0.2 mm. Hg pressure, leaving a residue of 52 g.

(b) A solution is prepared from 205 g. of ethyl acetate, 34 g. of vinylacetate, 34 g. of n-butylacrylate and 22 g. of the acrylic acid-[3-tolyloxy-2-hydroxy]-propyl ester manufactured according to Example 6(a). 100 g. of this solution are heated to 75° C. and 0.07 g. of benzoyl peroxide is then added. After 10 minutes the polymerization sets in with the temperature rising to 80° C. The remainder of the solution of the monomers is then added in the course of 2 hours, while keeping the temperature constant at 80° C. During this time another three additions of 0.07 g. each of benzoyl peroxide are made, whereupon the polymerization is complete. The resulting highly viscous solution of the copolymer has a dry content of 36.1%.

*Example 7*

A mixture of 75 g. of the colourless solution, prepared as described in Example 1(b), of the hydroxylated copolymer (dry content 39.6%) and 93 g. of a butanolic solution (dry content about 80%) of a melamine-formaldehyde condensation product etherified with n-butanol, which is soluble in benzinehydrocarbons, is dissolved in 232 g. of a solvent mixture of the following composition: 50 g. of benzyl alcohol, 150 g. of xylene, 150 g. of ethanol, 150 g. of methylethyl ketone, 400 g. of ethyleneglycol monoethyl ether and 100 g. of diacetone alcohol. The resulting solution is then filtered.

The lacquer prepared in this manner is applied to sheets of aluminium and stove-cured for 30 minutes at 180° C. The resulting well-adhering, colorless, clear and pliable coat cannot be detached with acetone. The Erichsen test displays an indentation value of 6.7 mm. for a layer thickness of about 0.02 mm.

*Example 8*

100 g. of the colorless solution, prepared according to Example 1(b), of the hydroxylated copolymer (dry content 39.6%) are mixed with 6 g. of the polyisocyanate described below and 50 g. of ethyl acetate. A fine nylon fabric is brushed with this solution on a floating knife coater twice on the same side with intermediate drying. The fabric is then dried for 5 hours at 80° C. in a drying cabinet and hardened. The weight of the dry coat is about 15 g. per square metre. The fabric thus treated is an oilsilk type of nylon having a non-tacky and only slightly paper-like handle; when washed in water or dry-cleaned its properties remain substantially unchanged.

To make a quantitative comparison of the water-repellency specimens of the uncoated nylon fabric, of the untreated coated nylon fabric and of the coated nylon fabric are washed with soap in the usual manner and, respectively, dry-cleaned and then subjected to the so-called Heermann test to determine what height of a column of water is required to act upon the fabric until the water pressure no longer rises because the water is pressed through the fabric in droplets.

In the following table there is shown the column of water which a freely suspended piece of fabric of 100 square centimetre extent can carry when the water is added at a standard rate of 100 cc. per minute. The figures shown represent the maximum height of the column of water $S_M$ in cm. Accordingly, a high $S_M$ value revealed in this test indicates better water-repellency:

|  | Heermann test, $S_M$ in cm. |
|---|---|
| Uncoated fabric | 0 |
| Coated fabric | 140 |
| Coated fabric, washed for 30 minutes at 40° C. with 5 g. of soap per litre | 131 |
| Coated fabric treated with trichlorethylene for 15 minutes at 20 to 30° C. | 118 |

The polyisocyanate used above is prepared thus: A mixture of 20 g. of trimethylolpropane, 78.5 g. of toluylene diisocyanate and 150 g. of ethyl acetate is heated for 3 hours at 80° C., during which time all of the toluylene diisocyanate has reacted. The solution is then concentrated until it contains 75.4% of dry solids.

*Example 9*

100 g. of a solution (dry content 37.5%) prepared as described in Example 2 from a copolymer from 99 parts by weight of n-butylacrylate, 99 parts by weight of vinylacetate and 28 parts by weight of acrylic acid-[3-(n-butoxy)-2-hydroxy]propyl ester are mixed with 10 g. of the ester described below from highly methylated methylolmelamine and stearic acid and with 5 g. of a butanolic solution (dry content about 80%) of a melamine-formaldehyde condensation product which is etherified with n-butanol and is soluble in benzinehydrocarbons, and 50 g. of ethyl acetate. A fine nylon fabric is twice coated with intermediate drying on one side with this solution on a floating knife coater, then dried at 80° C. and hardened for 15 minutes at 140° C. The weight of the dry coat is about 15 g. per square metre. The coated nylon fabric has a non-tacky, soft handle and in addition it displays a good water-repellency effect. These properties are not appreciably affected by washing with soap or dry-cleaning with trichlorethylene.

For a quantitative comparison of the impermeability to water specimens of the uncoated nylon fabric, of the untreated coated nylon fabric and of the coated nylon fabric were subjected to a conventional washing with soap and dry-cleaning respectively and then to the Heermann test described in Example 8. The tests revealed the following data:

|  | Heermann test, $S_M$ in cm. |
|---|---|
| Uncoated fabric | 0 |
| Coated fabric | 150 |
| Coated fabric, washed for 30 minutes at 40° C. with 5 g. of soap per litre | 150 |
| Coated fabric, treated with trichlorethylene for 15 minutes at 25° C. | 150 |

When the coating of the nylon fabric described above is performed, instead of with 100 g. of the solution prepared according to Example 2 of a hydroxylated copolymer, with a solution prepared otherwise as described in Example 2 of a copolymer from 99 parts by weight of n-butylacrylate and 99 parts by weight of vinylacetate, the resulting coating remains completely soluble in trichlorethylene even after the heat treatment described above.

The above-mentioned ester of highly methylated methylolmelamine and stearic acid is prepared in the following manner:

To obtain the methylolmelamine methyl ether 324 parts by weight (1 mol) of finely comminuted hexamethylolmelamine are stirred at room temperature into 2000 parts by volume of methanol containing 100 parts by volume of concentrated hydrochloric acid. After 10 minutes the methylol compound has dissolved. Immediately thereupon the solution is stirred with about 160 parts by weight of calcined sodium carbonate until it displays a neutral reaction towards litmus. The precipitated salt is filtered off and the solution concentrated under vacuum to a syrupy consistency. The syrupy is concentrated to about 99% and then filtered while still hot to remove the residual salt.

A mixture of 1 part of this methylolmelamine methyl ether and 1.3 parts of stearic acid is heated under a pressure of 10 to 20 mm. Hg at 180–200° C. until the acid number of the product has dropped to 5 to 8.

What is claimed is:

1. A copolymerization product which contains copolymerized
   (a) an ester of the formula

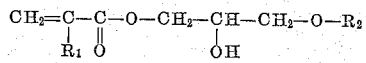

in which $R_1$ is a member selected from the group consisting of hydrogen atom and the methyl group and $R_2$ is a member selected from the group consisting of alkyl group with 1 to 18 carbon atoms, the phenyl group and the cresyl group; and
   (b) at least one other copolymerizable ethylenically unsaturated monomer, wherein the copolymerization product contains copolymerized 5 to 30 percent by weight of an ester (a) calculated on the total weight of the monomers.

2. A copolymerization product as claimed in claim 1, wherein the ester (a) is acrylic acid-[3-(n-butoxy)-2-hydroxy]-propyl ester.

3. A copolymerization product as claimed in claim 1, wherein the ester (a) is methacrylic acid-[3-(n-butoxy)-2-hydroxy]-propyl ester.

4. A copolymerization product as claimed in claim 1, wherein the monomer (b) is n-butyl-acrylate.

5. A copolymerization product as claimed in claim 1, wherein the monomer (b) is vinylacetate.

6. A process for the manufacture of water-repellent coatings on synthetic textile fabrics, wherein a substantially anhydrous coating composition containing
(1) a concentrated solution in an organic solvent, of a copolymerization product which contains copolymerized
  (a) an ester of the formula $$CH_2=C-C-O-CH_2-CH-CH_2-O-R_2$$
  $$\phantom{CH_2=}|\phantom{-}\|\phantom{-O-CH_2-}|$$
  $$\phantom{CH_2=C}R_1\phantom{-}O\phantom{-O-CH_2-CH}OH$$

in which $R_1$ is a member selected from the group consisting of hydrogen atom and the methyl group and $R_2$ is a member selected from the group consisting of alkyl group with 1 to 18 carbon atoms, the phenyl group and the cresyl group; and
  (b) at least one other copolymerizable ethylenically unsaturated monomer in an organic solvent; and
(2) as cross-linking agent a polyfunctional compound which is soluble in the organic solvent and which is selected from the group consisting of polyisocyanates, etherified melamine-formaldehyde condensation products and reaction products of etherified melamine formaldehyde condensation products with higher fatty acids, is applied to said fabric and the coating is then hardened by heating.

References Cited by the Examiner
UNITED STATES PATENTS 2,681,897  6/54  Frazier et al. _____ 260—86.3
3,090,762  5/63  Maeder et al. _____ 260—21

LEON J. BERCOVITZ, *Primary Examiner.*

JAMES A. SEIDLECK, *Examiner.*